US010044104B1

(12) United States Patent
Bartko et al.

(10) Patent No.: US 10,044,104 B1
(45) Date of Patent: Aug. 7, 2018

(54) TEST ARRANGEMENT AND TEST METHOD

(71) Applicant: Rohde & Schwarz GmbH & Co. KG, München (DE)

(72) Inventors: Hendrik Bartko, Unterhaching (DE); Vincent Abadie, Hohenschäftlarn (DE); Corbett Rowell, München (DE); Heinz Mellein, Haar (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 15/649,910

(22) Filed: Jul. 14, 2017

(51) Int. Cl.
*H04W 24/00* (2009.01)
*H01Q 3/26* (2006.01)
*H01Q 1/12* (2006.01)
*H01Q 3/46* (2006.01)

(52) U.S. Cl.
CPC ............. *H01Q 3/267* (2013.01); *H01Q 1/125* (2013.01); *H01Q 3/46* (2013.01)

(58) Field of Classification Search
CPC ..................................................... H04W 24/06
USPC .................................................... 455/425, 97
See application file for complete search history.

(56) References Cited

U.S. PATENT DOCUMENTS

| | | | | | |
|---|---|---|---|---|---|
| 3,662,389 | A * | 5/1972 | Coffin | G01R 29/10 342/360 |
| 4,800,387 | A * | 1/1989 | Joy | G01R 29/10 342/165 |
| 5,432,523 | A * | 7/1995 | Simmers | G01R 29/10 342/360 |
| 5,485,158 | A * | 1/1996 | Mailloux | G01R 29/10 342/165 |
| 5,886,662 | A * | 3/1999 | Johnson | G01S 13/88 342/192 |
| 6,633,258 | B2 * | 10/2003 | Lindenmeier | H04B 7/0808 342/374 |
| 8,295,777 | B1 * | 10/2012 | Yenney | H04W 24/06 455/435.1 |
| 8,620,301 | B1 * | 12/2013 | Hessel | H04W 16/18 455/277.2 |
| 2006/0003810 | A1 * | 1/2006 | Saikyo | H04W 24/00 455/566 |
| 2009/0046002 | A1 * | 2/2009 | Tsunoda | G01S 7/4004 342/167 |
| 2009/0160706 | A1 * | 6/2009 | Oh | G01R 29/10 342/359 |

(Continued)

*Primary Examiner* — Wen Huang
(74) *Attorney, Agent, or Firm* — Westman, Champlin & Koehler, P.A.

(57) ABSTRACT

A test arrangement for wirelessly testing a device under test comprises a test antenna for receiving wireless signals from the device under test, a movable test antenna carrier that carries the test antenna and is movable to adjust the distance between the test antenna and the device under test, a transformation processor that is coupled to the test antenna and performs a near-field to far-field transformation based on the wireless signals received from the device under test and outputs respective transformed signals, and a signal processor that is coupled to the transformation processor and calculates a minimum far-field distance for the device under test based on the transformed signals, wherein the signal processor evaluates if the distance between the test antenna and the device under test is equal to or larger than the calculated minimum far-field distance.

18 Claims, 6 Drawing Sheets

(56) References Cited

U.S. PATENT DOCUMENTS

| | | | | |
|---|---|---|---|---|
| 2010/0073246 | A1* | 3/2010 | Oh | G01R 29/0892 343/703 |
| 2011/0230143 | A1* | 9/2011 | Lundstrom | H04W 24/06 455/67.11 |
| 2011/0298669 | A1* | 12/2011 | Rao | H01Q 1/243 343/702 |
| 2011/0306306 | A1* | 12/2011 | Reed | H04B 17/0085 455/67.11 |
| 2012/0162031 | A1* | 6/2012 | Oh | G01R 29/10 343/703 |
| 2013/0027256 | A1* | 1/2013 | Guo | H04L 41/0823 343/703 |
| 2013/0303089 | A1* | 11/2013 | Wang | H04W 24/06 455/67.12 |
| 2014/0098846 | A1* | 4/2014 | Emmanuel | H04W 24/06 375/224 |
| 2014/0187260 | A1* | 7/2014 | Jiang | H04W 64/00 455/456.1 |
| 2016/0359573 | A1* | 12/2016 | Pauly | H04B 17/12 |
| 2018/0006745 | A1* | 1/2018 | Vanwiggeren | H04B 17/3912 |

* cited by examiner

TEST ARRANGEMENT AND TEST METHOD

TECHNICAL FIELD

The present invention relates to a test arrangement. The present invention further relates to a test method.

BACKGROUND

Although applicable in principal to any wireless test system, the present invention and its underlying problem will be hereinafter described in combination with testing of wireless devices.

The use of wireless communication systems for communication between electronic device increases continually with the advance of high-speed wireless data communications.

During development or production of devices for such communication systems it is necessary to thoroughly test the devices for compliance with communication standards and legal regulations, especially regarding wireless communication standards and legal regulations.

Usually the respective wireless communication standards and legal regulations will determine the circumstances under which a test must be performed.

For example, usually the compliance tests of such devices require far-field measurements of the respective devices. However, far-field measurements usually require large measurement chambers with sizes of up to 100s of meters or complex and costly arrangements, like e.g. Compact Antenna Test Ranges or CATRs.

Against this background, the problem addressed by the present invention is to provide a simple test equipment for wireless devices.

SUMMARY

The present invention solves this problem with a test arrangement with the features of claim 1 and by a test method with the features of claim 10.

Accordingly it is provided:

A test arrangement for wirelessly testing a device under test, the test arrangement comprising a test antenna for receiving wireless signals from the device under test and/or transmitting wireless signals to the device under test, a movable test antenna carrier that carries the test antenna and is movable to adjust the distance between the test antenna and the device under test, a transformation processor that is coupled to the test antenna and performs a near-field to far-field transformation based on the wireless signals received from the device under test and/or transmitted to the device under test and outputs respective transformed signals, and a signal processor that is coupled to the transformation processor and calculates a minimum far-field distance for the device under test based on the transformed signals, wherein the signal processor evaluates if the distance between the test antenna and the device under test is equal to or larger than the calculated minimum far-field distance.

Further, it is provided:

A test method for wirelessly testing a device under test, the test method comprising receiving wireless signals from the device under test and/or transmitting wireless signals to the device under test with a test antenna, performing a near-field to far-field transformation based on the wireless signals received from the device under test and/or transmitted to the device under test and outputting respective transformed signals with a transformation processor that is coupled to the test antenna, calculating a minimum far-field distance for the device under test based on the transformed signals with a signal processor that is coupled to the transformation processor, and evaluating with the signal processor if the distance between the test antenna and the device under test is equal to or larger than the calculated minimum far-field distance.

The present invention is based on the fact that the radiation behavior of antennas is characterized by their far-field radiation pattern. As explained above, compliance tests will therefore usually require a far field measurement.

The far-field region of an antenna can be assumed to hold for distances greater than 2d2/λ. In this case d is the diameter of a minimum sphere enclosing the active surface, e.g. the antenna, completely. Antennas, which are large in terms of the wavelength (e.g. antennas for satellite communications, base station antennas, etc.), develop their far-field radiation characteristic in a large distance from the active surface.

But also in small devices, like e.g. mobile phones or IoT (Internet of Things) devices it may be difficult to determine the correct distance for a far field measurement. To be on the safe side, especially when performing compliance tests, the active surface is usually assumed to be as large as the total device. Since the diameter in the above formula is squared, very large distances may be assumed to be necessary. For example a mobile phone may be 10 cm high but the antenna may only be 1 cm in diameter. In this case, the assumed safe distance would be a factor 100 larger than the actually required distance. Instead of e.g. measuring in a distance of 1 m the measurement would therefore be performed with a distance of 100 m.

The present invention however tries to avoid such large distances by calculating the minimum far-field distance that is required to perform measurements in the far-field of the wireless device.

To determine the minimum far-field distance, the present invention assumes that the measurement of the test antenna is performed in the near-field and performs a far-field transformation. This is also valid, if the measurement was actually performed in the far-field.

Based on the transformed signals the minimum far-field distance is then calculated and it is verified if the test antenna is far away enough from the device under test to produce a valid far-field measurement.

As mentioned above, the test antenna is provided on a movable test antenna carrier. With the help of the movable test antenna carrier the distance between the test antenna and the device under test may be adjusted as required. The calculation of the minimum far-field distance may reveal that the measurement has been performed in the near field of the device under test. In this case the movable test antenna carrier may be used to adjust the distance of the test antenna to the device under test accordingly and repeat the measurement.

The movable test antenna carrier may e.g. comprise a guide or rail and a slide that carries the test antenna. The movable test antenna carrier may also comprise a slide with wheels or simply be a mechanical holding device that is not fixed to the ground and may therefore be carried into the required position.

The test antenna may be any type of antenna that is adequate to perform the required measurements. Such a test antenna may e.g. be a microstrip antenna or a horn antenna and may be adapted in size according to the relevant signal frequencies or wavelengths.

The test antenna may comprise a signal connector and may be coupled to the transformation processor e.g. via a measurement cable. Such a measurement cable may e.g. be a cable that has the required RF properties, e.g. a low damping factor in the required frequency ranges.

The transformation processor and the signal processor may e.g. comprise a general purpose processor with corresponding instructions. Further, the transformation processor and the signal processor may comprise interfacing elements that are coupled to the processor, receive the measured signals from the test antenna and provide the received signals to the processor. Such interfacing elements may e.g. comprise analog to digital converters that convert the received signals into digital data that may be processed by the processor. Such dedicated digital to analog converters may e.g. be coupled to the processor via a serial or a parallel digital interface. Between the digital to analog converters and an input port analog elements, like e.g. filters comprising resistors, capacitors and inductors, or the like may be provided.

It is understood, that a dedicated measurement device may also be provided in a possible implementation. The dedicated measurement device may be coupled to the test antenna and may e.g. be a vector network analyzer, an oscilloscope or the like.

Further embodiments of the present invention are subject of the further subclaims and of the following description, referring to the drawings.

In a possible embodiment, the test arrangement may comprise an electric drive unit that may drive the movable test antenna carrier into a position that sets the test antenna apart from the device under test by at least the calculated minimum far-field distance.

With the electric drive unit it is possible to fully automate the measurements of the device under test. If for example the calculated minimum far-field distance is larger than the actual distance of the test antenna to the device under test, the signal processor or any other processor or computer may control the electric drive unit to position the movable test antenna carrier accordingly. It is understood, that the electric drive unit may e.g. comprise an electric motor, power drivers that are connected to the electric motor and a motor controller. The electric drive unit may comprise any type of electric motor. Possible motors are for example rotary motors, linear motors or the like. The electric drive unit may also comprise a plurality of electric motors. A possible electric drive unit may e.g. be a robot-arm like drive unit with a plurality of electric motors and joints.

In a possible embodiment, the transformation processor may comprise first instructions that cause the transformation processor to perform the near-field to far-field transformation of the received wireless signals.

As already mentioned above, the transformation processor may comprise hardware elements, like e.g. a processing unit. However, the transformation processor may also be software implemented at least in part. The first instructions may therefore be stored in a memory that is coupled to a general purpose processor, e.g. via a memory bus. The processor may further execute an operating system that loads and executes the first instructions. The processor may e.g. be an Intel processor that runs a Windows or Linux operating system that loads and executes the first instructions. In another embodiment, the processor may be a processor of a measurement device that may e.g. run an embedded operating system that loads and executes the first instructions.

In a possible embodiment, the signal processor may comprise second instructions that cause the signal processor to calculate the minimum far-field distance.

As already mentioned above, the signal processor may comprise hardware elements, like e.g. a processing unit. However, the signal processor may also be software implemented at least in part. The second instructions may therefore be stored in a memory that is coupled to a general purpose processor, e.g. via a memory bus. The processor may further execute an operating system that loads and executes the second instructions. The processor may e.g. be an Intel processor that runs a Windows or Linux operating system that loads and executes the second instructions. In another embodiment, the processor may be a processor of a measurement device that may e.g. run an embedded operating system that loads and executes the second instructions.

It is understood, that a single computer or processor may load and execute the first instructions and the second instructions.

In a possible embodiment, the transformed signals may be provided as far-field antenna pattern by the transformation processor.

It is understood, that the transformation processor may provide digital data to the signal processor. In case of software implemented transformation and signal processors the digital data may be provided as data in a memory of a computer that executes the software implemented transformation and signal processors. The digital data may e.g. be stored as variables in the memory.

It is therefore further understood, that the format of the digital data may be freely chosen but that the content of the digital data refers to the far-field antenna pattern. This means that the digital data may form the basis for reconstructing the far-field antenna pattern of the device under test. Reconstructing in this case refers to reconstructing for further calculations by the signal processor. However, reconstructing may also refer to visually reconstructing the far-field antenna pattern for a user.

It is understood, that an output interface may be provided that also provides the measured signals. This measured signals may however refer to the near-field antenna pattern, if the measurement was performed within a distance to the device under test that is below the minimum far-field distance. The output interface may be provided in the transformation processor, the signal processor or as a dedicated interface to the test arrangement.

In a possible embodiment, the signal processor may identify in the far-field antenna pattern the opening angle between the first nulls around the main lobe of the antenna pattern and calculate the minimum far-field distance based on the determined opening angle.

The far-field antenna pattern may e.g. provide directional measured signal strength for the device under test. This means that e.g. for a given angle the measured signal strength is given in the far-field antenna pattern. The far-field antenna pattern may therefore e.g. comprise an array of signal strength values. The number of elements of the array defines the resolution with which the far-field antenna pattern is provided. If for example 360 elements are provided for a 360° antenna pattern, the resolution is 1°. If for example 3600 elements are provided for the same 360° antenna pattern, the resolution is 0.1°. It is understood, that any other resolution may also be chosen.

The far-field antenna pattern may e.g. be oriented such that the main lobe of the antenna pattern defines the 0° direction or position.

The far field distance R_FF may be given by:

$$R\_FF=2*D^2/\text{lambda}. \quad (1)$$

Wherein D is the diameter of the radiating region, and lambda is the wavelength.

The beam width is a function of the diameter of the radiating region and the wavelength. In a model, where two mono-pol antennas radiate at a distance D, the angle between the first nulls around the main lobe may be given by:

$$\text{alpha\_min}=2*\text{lambda}/D$$

wherein alpha_min is the opening angle between the first nulls around the main lobe.

Consequently:

$$D=2*\text{lambda}/\text{alpha\_min}. \quad (2)$$

Inserting (2) in (1) results in:

$$R\_FF=8*\text{lamda}/\text{alpha\_min}^2. \quad (3)$$

Equation (3) holds exactly true for two radiating monopoles. For the general case of several radiating elements within the region D, it is only an approximation. Therefore $$R\_FF\sim 8*\text{lamda}/\text{alpha\_min}^2. \quad (4)$$

A constant const1 may be introduced, such that:

$$R\_FF\sim \text{const1}*\text{lamda}/\text{alpha\_min}^2. \quad (5)$$

The variable const1 is about 8. In embodiments the value of const1 may be between 6 and 10, especially between 7 and 9.

In an exemplary embodiment, the far-field antenna pattern may be stored in a 360 element array. The 0° angle is the 180th element. The signal processor may now look for the two first local minima to the left and right of the 0° angle, i.e. the $180^{th}$ element. The minima may e.g. be at the $161^{st}$ element and the $201^{st}$ element. This means that the angle alpha_min is 40°.

In a possible embodiment, the signal processor may identify in the far-field antenna pattern the half power beam width of the main beam of the antenna pattern and calculate the minimum far-field distance based on the determined half power beam width.

The half power beam width or HPBW is the width of the main lobe, for which the signal power drops to half the maximum value. The width may e.g. be given in ° (degree) or rad (radian).

The half power beam width, HPBW, is approximately half the angle of alpha_min:

$$\text{alpha\_min}\sim 2*\text{HPBW} \quad (7)$$

Inserting (7) into (5) results in:

$$R\_FF\sim 2*\text{lamda}/\text{HPBW} \quad (8)$$

A constant const2 may be introduced, such that:

$$R\_FF=\text{const2}*\text{lamda}/\text{HPBW} \quad (9)$$

wherein const2 is about 2. In embodiments the value of const2 may be between 1 and 4, especially between 1.5 and 3.

In a possible embodiment, the test arrangement may comprise a measurement chamber that may accommodate the test antenna and the device under test.

The measurement chamber may comprise a shielding or protective housing that isolates the test arrangement from any outside interference or disturbance during the measurements. It is understood that the measurement chamber may e.g. also comprise a door or sealable opening for accessing the insides of the measurement chamber, e.g. to place the device under test in the measurement chamber.

In a possible embodiment, the measurement chamber may comprise an anechoic chamber.

An anechoic chamber is a measurement chamber that is designed to completely absorb reflections of electromagnetic waves. The interior surfaces of the anechoic chamber may be covered with radiation absorbent material, RAM. RAM is designed and shaped to absorb incident RF radiation as effectively as possible. Measurements in electromagnetic compatibility and antenna radiation patterns require that signals arising from the test setup, like e.g. reflections, are negligible to avoid the risk of causing measurement errors and ambiguities.

With the anechoic chamber the quality of the measurements performed with the test arrangement may therefore be increased.

Especially for smaller devices like e.g. mobile phones or IoT devices, a small anechoic chamber may be sufficient to perform conformance tests because the radiating surface may be relatively small. As explained above, the radiating surface of such devices may be relatively small compared to their overall size.

With the present invention it is therefore now possible to use small measurement chambers for performing the measurements on the device under test and evaluate if the minimum far-field distance requirement is met. If the minimum far-field distance requirement may be met with a small measurement chamber, it is not necessary to perform further measurements in larger, more complex and costly chambers.

Manufacturers of wireless electronic devices may therefore e.g. start their measurements with such a “small” test arrangement and only rent or buy a larger test chamber if necessary.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
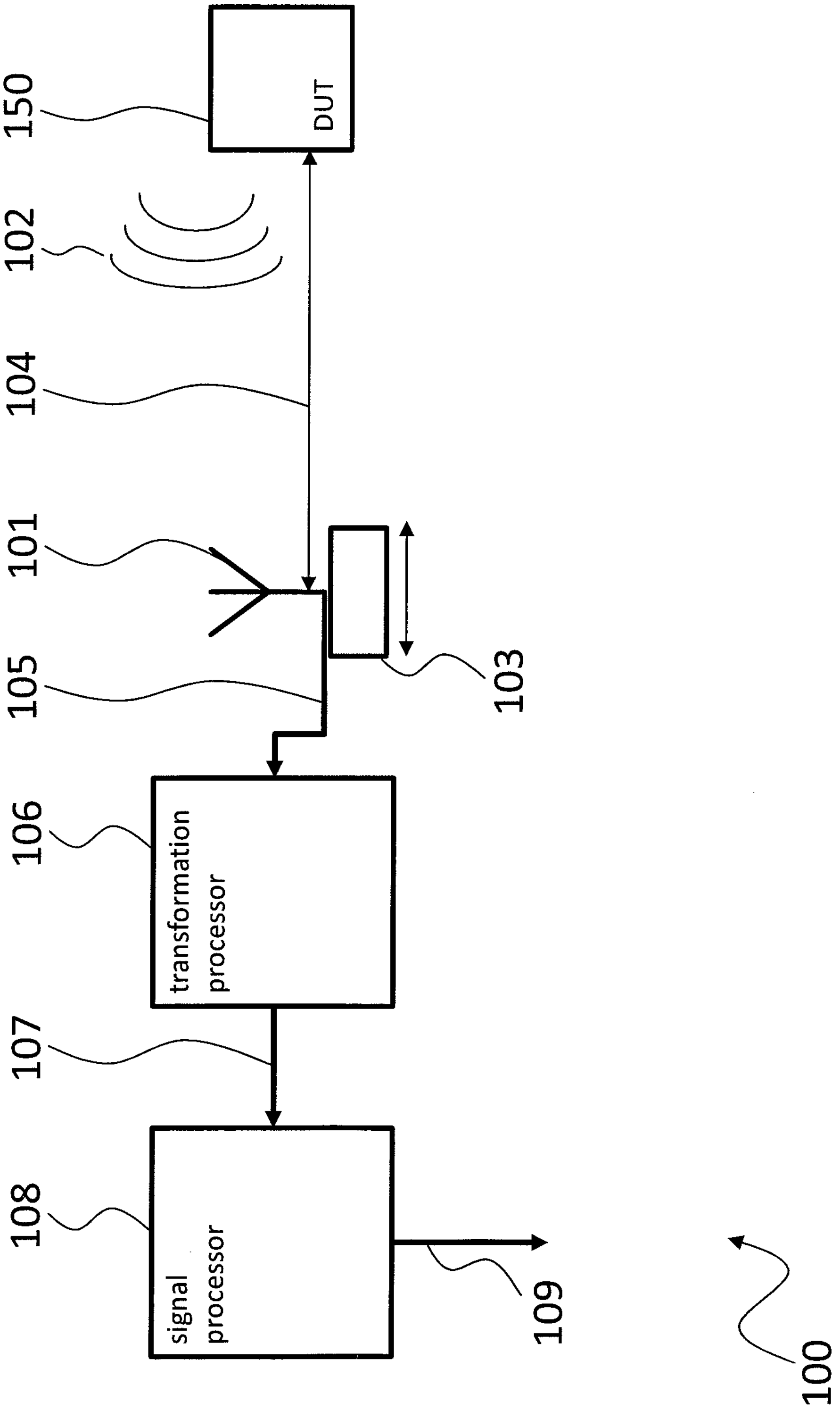
FIG. 1 shows a block diagram of an embodiment of a test arrangement according to the present invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DETAILED DESCRIPTION OF THE DRAWINGS

FIG. 1 shows a block diagram of an embodiment of a test arrangement 100. The test arrangement 100 comprises a test antenna 101. The test antenna 101 is arranged on a movable test antenna carrier 103 that carries the test antenna 101 and allows adjusting the distance 104 between the test antenna 101 and the device under test 150. The test antenna 101 is coupled to a transformation processor 106. The transformation processor 106 is coupled to a signal processor 107.

The test antenna 101 receives wireless signals 102 from the device under test 150. It is understood, that although not shown, the test antenna 101 may also transmit wireless signals 102 to the device under test 150. Respective signal generators may be provided and connected to the test antenna 101. The device under test 150 may then provide data about the receive power to the transformation processor 106.

The test antenna 101 is positioned in a distance 104 from the device under test 150. With the movable test antenna carrier 103 this distance 104 may be adjusted. The movable test antenna carrier 103 may e.g. be a slide and a linear guide or robot-arm like arrangement or any other movable arrangement. The movable test antenna carrier 103 may but need not necessarily be motor driven.

The test antenna 101 provides the received signal 105 to the transformation processor 106. The transformation processor 106 performs a near-field to far-field transformation with the received signals and outputs the transformed signal 107. The transformed signal 107 is then used by the signal processor 108 to calculate the minimum far-field distance 109.

The minimum far-field distance is the minimum distance between the device under test 150 and the test antenna 101 that has to be provided for the test antenna 101 to be in the far-field of the device under test 150. As explained above, this is a requisite for most compliance tests.

The calculated value for the minimum far-field distance 109 may then e.g. be used by a user to adjust the distance between the test antenna 101 and the device under test 150. The minimum far-field distance 109 may also be used to simply evaluate, if the measurement was performed in the far-field of the device under test 150 and is therefore valid.

It is understood, that the transformation processor 106 may implement any appropriate method for performing the near-field to far-field transformation. It is also understood, that this transformation is always be performed, i.e. also if the measurement is already performed in the far-field of the device under test 150.

Figure 4:
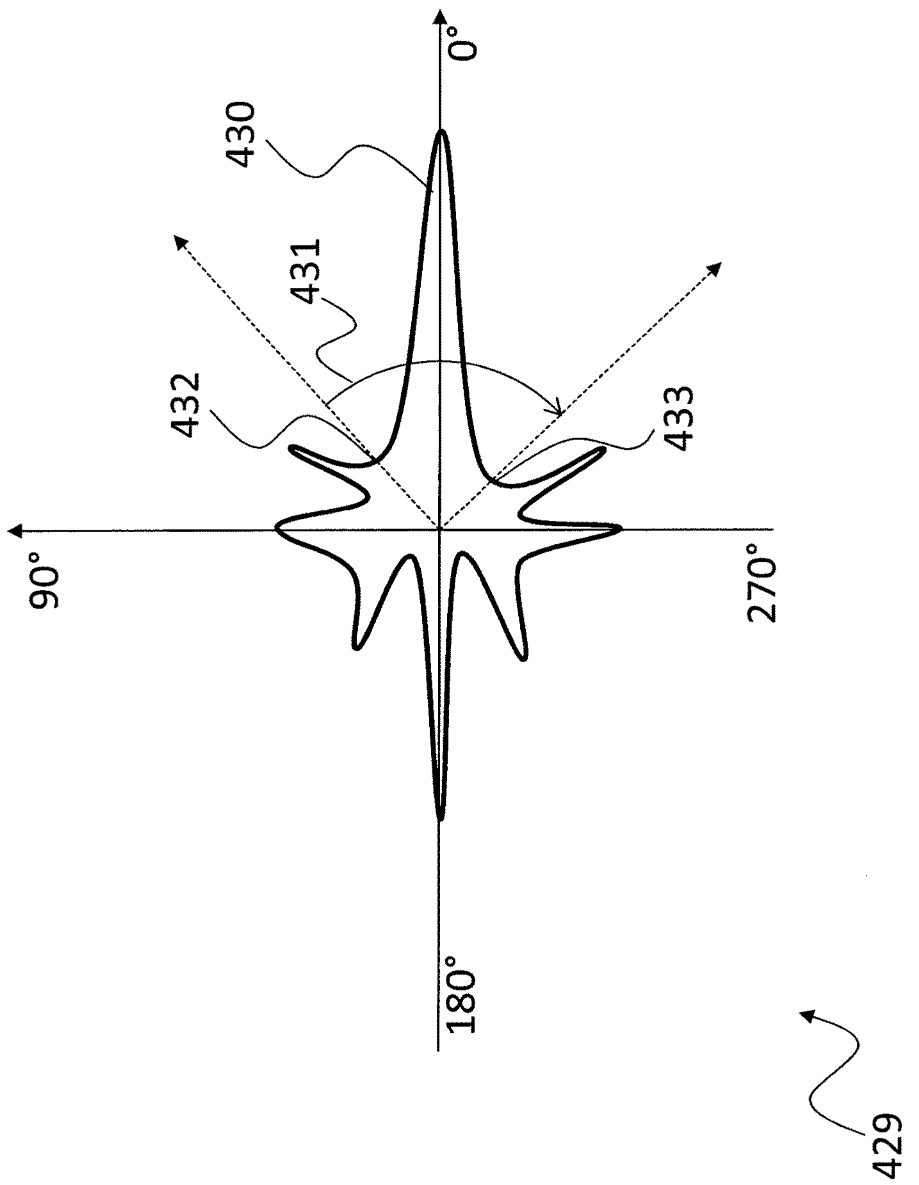
FIG. 4 shows an exemplary embodiment of an antenna pattern as according to the present invention.
Figure 5:
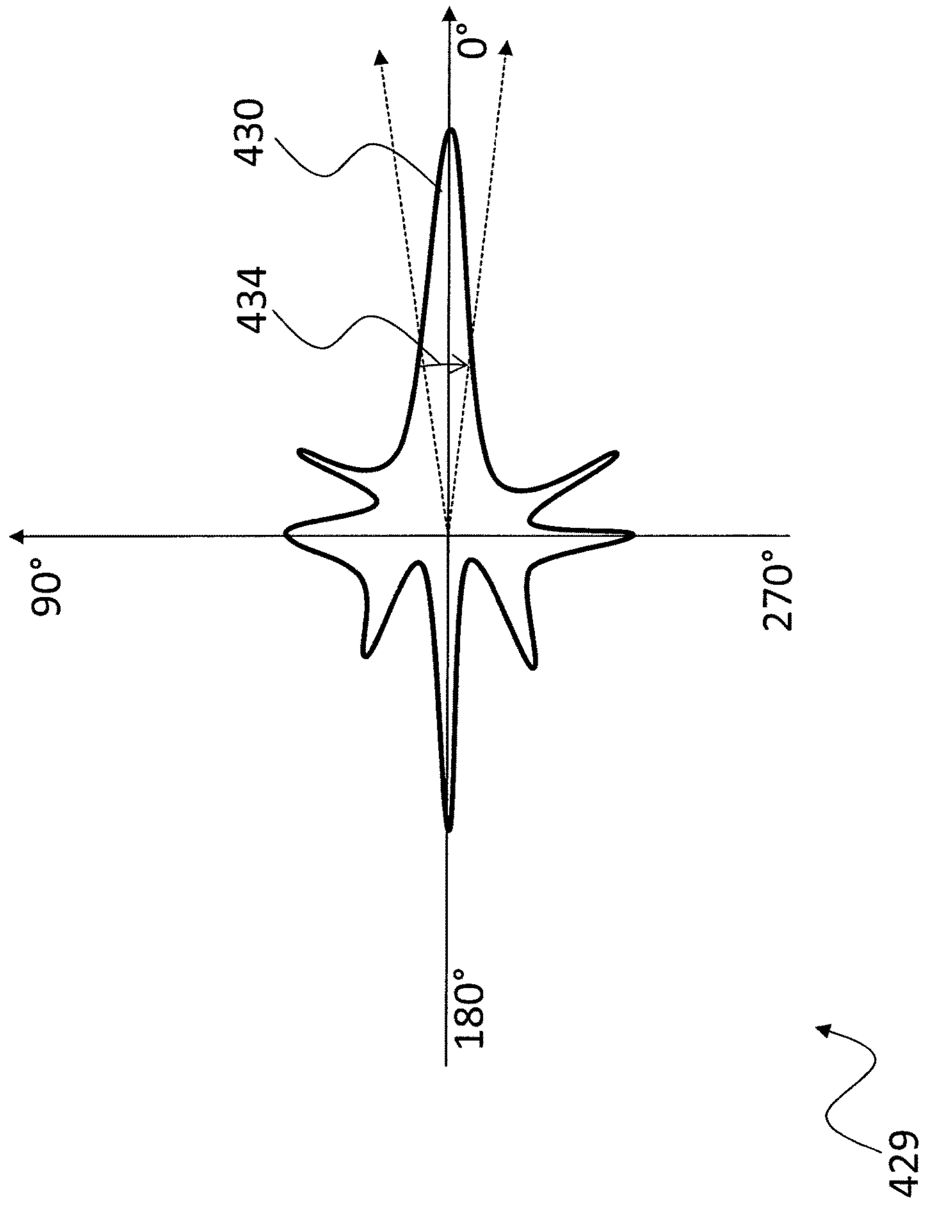
FIG. 5 shows another view of the antenna pattern of FIG. 4.

The signal processor 108 may calculate the minimum far-field distance 109 based either on the opening angle between the first nulls around the main lobe of the antenna pattern 429 of the device under test 150 (see FIG. 4) or based on the half power beam width of the main beam of the antenna pattern 429 of the device under test 150 (see FIG. 5).

The signal processor 108 may e.g. look for the maximum power value of the main lobe in the antenna pattern 429, which will usually be at 0°.

To identify the opening angle, the signal processor 108 may then search for the first nulls to the left and right of the maximum value. The antenna pattern 429 may e.g. be provided as array. The angle may therefore be calculated as the number of array elements between the elements that represent the nulls multiplied by the resolution of the antenna pattern 429. If for example the left null is at element 160 and the right null is at element 205 and the resolution is 1°, the opening angle is (205−160)*1°=45°.

The minimum far-field distance 109 may then be calculated based on the above mentioned formula:

$$R\_FF \sim \text{const1*lamda/alpha\_min\^{}2}. \qquad (5)$$

It is understood, that variable const1 may be chosen according to the type of antenna that is provided in the device under test 150. Usually const1 will be about 8. In embodiments the value of const1 may be between 6 and 10, especially between 7 and 9.

To identify the half power beam width, HPBW, of the main beam of the antenna pattern, the signal processor 108 may evaluate the antenna pattern to the left and right of the maximum power point of the main lobe until it encounters a value with half the power. Again, the antenna pattern 429 may e.g. be provided as array. The angle may therefore be calculated as the number of array elements between the elements that represent the half power values to the left and right. If for example the left null is at element 170 and the right null is at element 193 and the resolution is 1°, the half power beam width is (193−170)*1°=23°.

The minimum far-field distance 109 may then be calculated based on the above mentioned formula:

$$R\_FF = \text{const2*lamda/HPBW} \qquad (9)$$

It is understood, that variable const2 may be chosen according to the type of antenna that is provided in the device under test 150. Usually const2 will be about 2. In embodiments the value of const2 may be between 1 and 4, especially between 1.5 and 3.

It is understood, that the transformation processor 106 and the signal processor 108 may both be at least in part be software implemented, e.g. as a computer program that is executed by a processor. In embodiments, a signal analyzer, an oscilloscope, a vector network analyzer or the like may be used to process, e.g. convert into a digital signal, the received signal 105. After processing the received signal 105 it may be provided to a computer that provides the transformation processor 106 and the signal processor 108. Such a computer may at the same time control the movable test antenna carrier 103.

It is further understood, that the test antenna 101 may measure the wireless signal 102 emitted by the device under test 150 from different directions to allow the transformation processor 106 to generate the antenna pattern 429. To this end either the test antenna 101 may move around the device under test 150 or to safe space, the device under test 150 may rotate around its vertical axis.

Figure 2:
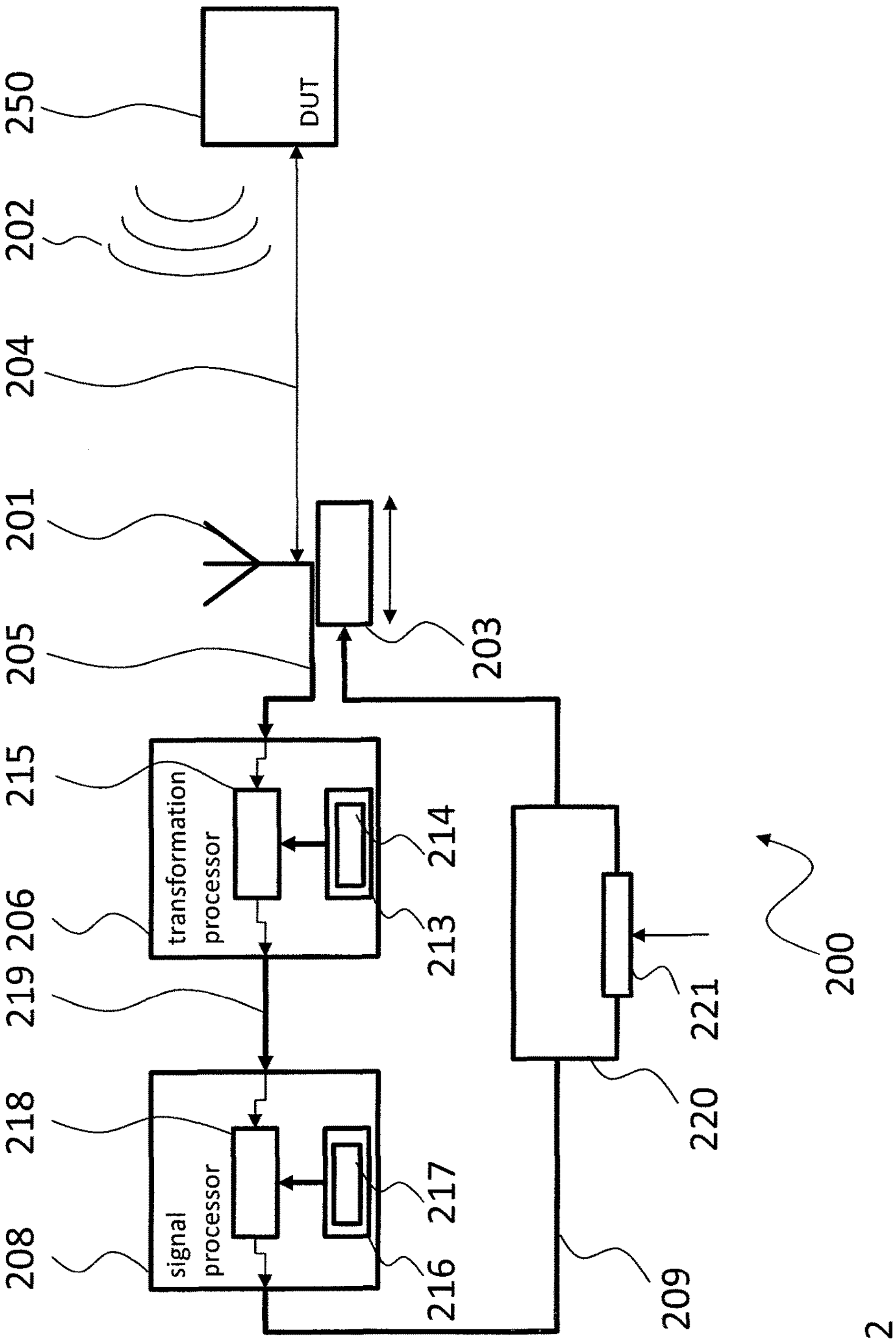
FIG. 2 shows a block diagram of another embodiment of a test arrangement according to the present invention.

FIG. 2 shows a block diagram of another test arrangement 200. The test arrangement 200 is based in the test arrangement 100. Therefore, the test arrangement 200 also comprises a test antenna 201 that is coupled to the transformation processor 206, which is coupled to the signal processor 208.

The transformation processor 206 may comprise a memory 213 that stores first instructions 214. The first instructions 214 may then be loaded from the memory 213 and executed by processor 215. The first instructions 214 may cause the processor 215 to perform the above mentioned transformation, i.e. the near-field to far-field transformation. The transformation processor 206 may provide the transformed signal as antenna pattern 219 to the signal processor 208.

The signal processor 208 may comprise a memory 216 that stores second instructions 217. The second instructions 217 may then be loaded from the memory 216 and executed by processor 217. The second instructions 217 may cause the processor 218 to perform the above mentioned calculations or steps that are necessary to calculate the minimum far-field distance 209.

It is understood, that a single memory and/or a single processor may be provided to implement the transformation processor 206 and the signal processor 208.

The test arrangement 200 further comprises an electric drive unit 220. The electric drive unit 220 is provided to supply and control the movable test antenna carrier 203. The electric drive unit 220 may be coupled to the signal processor 208 via a digital interface and further comprises a power interface 221 that supplies the electric drive unit 220 with the required electrical power to drive the movable test antenna carrier 203.

To determine the correct control data, the electric drive unit 220 may calculate the difference between the minimum far-field distance 209 and the distance 204 and control the movable test antenna carrier 203 accordingly.

Figure 3:
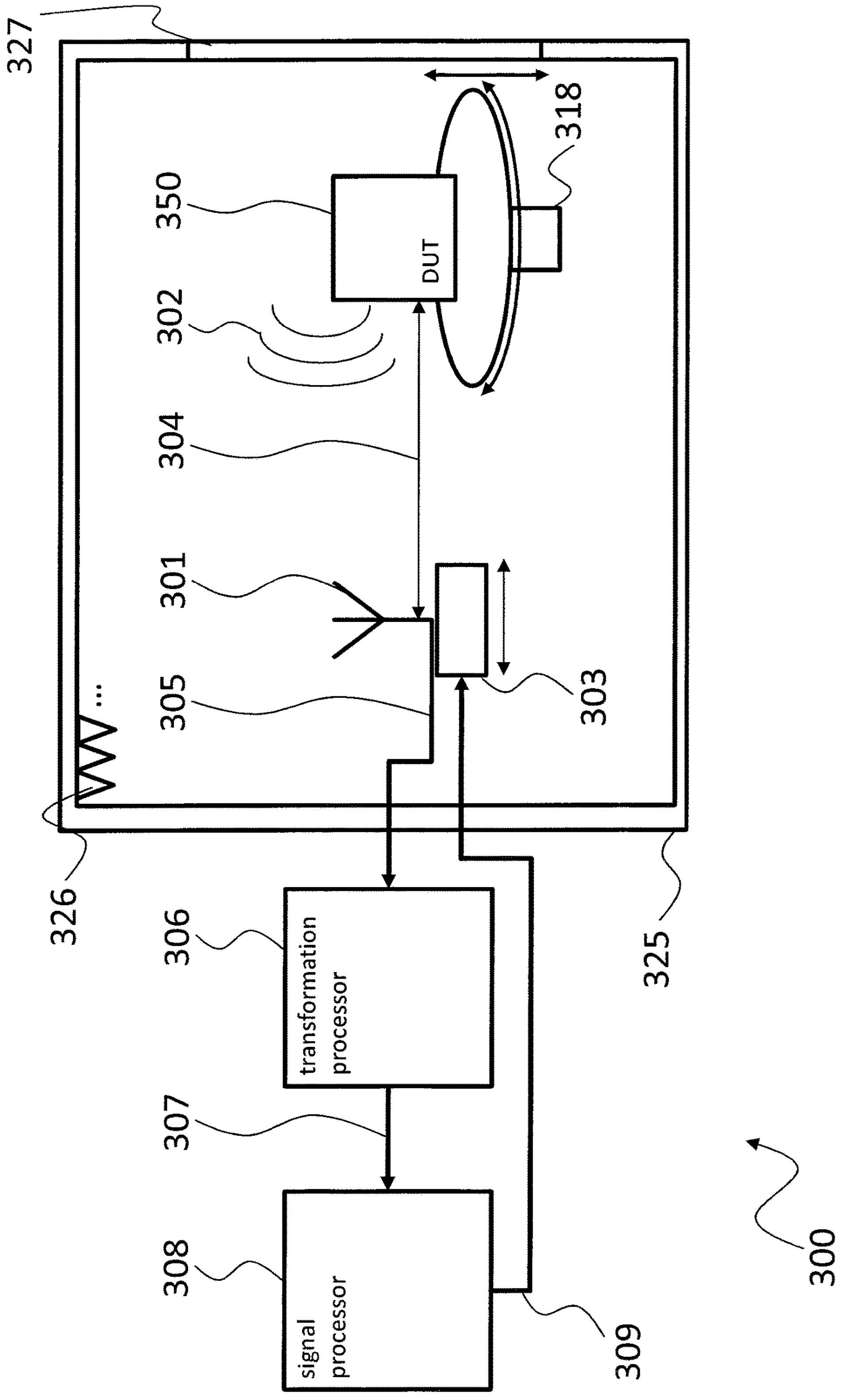
FIG. 3 shows a block diagram of another embodiment of a test arrangement according to the present invention.

FIG. 3 shows a block diagram of another test arrangement 300. The test arrangement 300 is based on the test arrangement 100. Therefore, the test arrangement 300 also comprises a test antenna 301 that is provided on a movable test antenna carrier 303 and is coupled to the transformation processor 306, wherein the transformation processor 306 is coupled to the signal processor 308.

The test arrangement 300 further comprises an anechoic chamber 325. The anechoic chamber 325 comprises absorbing elements 326 (only three are shown for sake of clarity). The absorbing elements 326 absorb or deflect the wireless signal 302 and therefore prevent reflections of the wireless signal 302. The anechoic chamber 325 may e.g. comprise an opening or a door 327 that allows inserting and removing the device under test 350.

Although not specifically shown in combination, it is understood, that the test arrangement 300 may e.g. be combined with the electric drive unit 220 of the test arrangement 200 and/or with the memory 213, the first instructions 214 and the processor 215 and/or with the memory 216, the first instructions 217 and the processor 218. The same applies to the test arrangement 100.

FIG. 4 shows an exemplary embodiment of an antenna pattern 429. In the antenna pattern 429 the 0° direction is oriented to the right and the angle increases counter-clock wise. The 90° direction is oriented to the top, the 180° direction to the left and the 270° direction to the bottom. The distance of the line of the antenna pattern 429 to the center point represents the power level for the respective angle.

In the antenna pattern 429 the opening angle 431 is shown. The opening angle 431 may be determined by looking for the first null 432 to the left of the main lobe 430 and the first null 433 to the right of the main lobe 430.

FIG. 5 shows another view of the antenna pattern 429 of FIG. 4. In FIG. 5 instead of the opening angle 431 the half power beam width 434 is shown. The half power beam width 434 is approximately half the opening angle 431 and may be found by following the line of the antenna pattern 429 starting at the maximum value, i.e. the 0° angle, and analyzing the power values until half the maximum value is found.

For sake of clarity in the following description of the method based FIG. 6 the reference signs used above in the description of apparatus based FIGS. 1-5 will be maintained.

Figure 6:
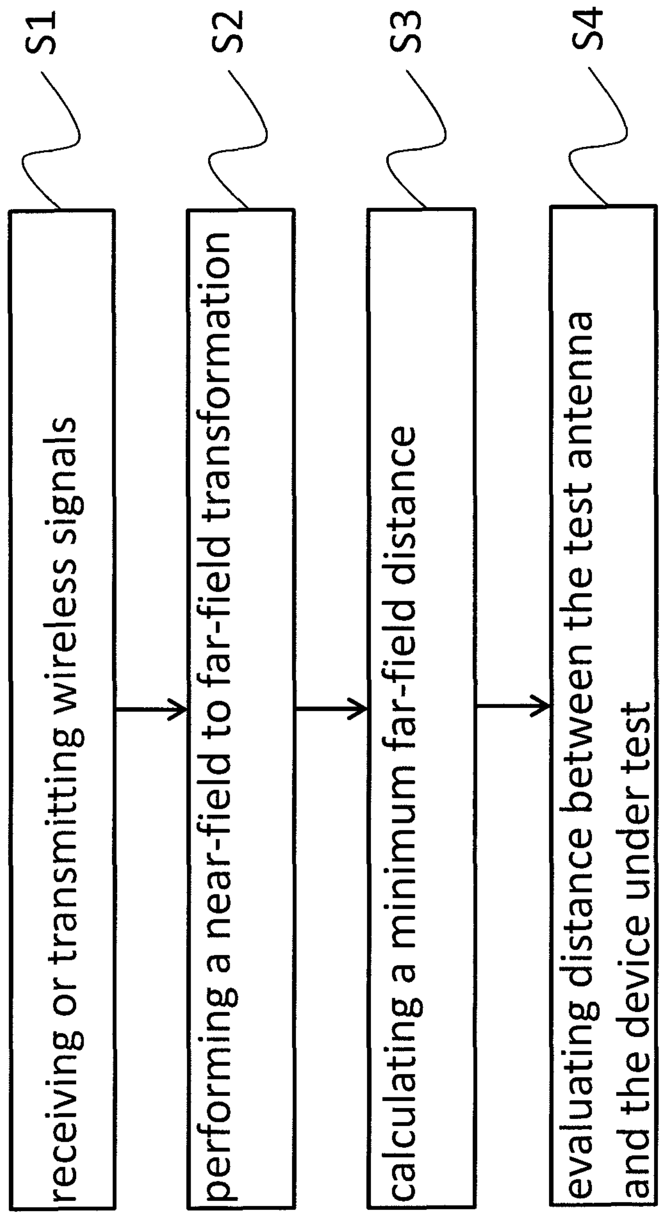
FIG. 6 shows a flow diagram of an embodiment of a test method according to the present invention.

FIG. 6 shows a flow diagram of a test method for wirelessly testing a device under test 150, 250, 350.

The test method comprises receiving S1 wireless signals 102, 202, 302 from the device under test 150, 250, 350 and/or transmitting wireless signals 102, 202, 302 to the device under test 150, 250, 350 with a test antenna 101, 201, 301, performing S2 a near-field to far-field transformation based on the wireless signals 102, 202, 302 received from the device under test 150, 250, 350 and/or transmitted to the device under test 150, 250, 350 and outputting respective transformed signals 107, 307 with a transformation processor 106, 206, 306 that is coupled to the test antenna 101, 201, 301, calculating S3 a minimum far-field distance 109, 209, 309 for the device under test 150, 250, 350 based on the transformed signals 107, 307 with a signal processor 108, 208, 308 that is coupled to the transformation processor 106, 206, 306, and evaluating S4 with the signal processor 108, 208, 308 if the distance between the test antenna 101, 201, 301 and the device under test 150, 250, 350 is equal to or larger than the calculated minimum far-field distance 109, 209, 309.

The test method may comprise driving a movable test antenna carrier 103, 203, 303, which carries the test antenna 101, 201, 301 and is movable to adjust the distance between the test antenna 101, 201, 301 and the device under test 150, 250, 350, into a position that sets the test antenna 101, 201, 301 apart from the device under test 150, 250, 350 by at least the calculated minimum far-field distance 109, 209, 309. The test antenna 101, 201, 301 and the device under test 150, 250, 350 may be accommodated in a measurement chamber. Further, the measurement chamber may comprise an anechoic chamber 325.

The transformation processor 106, 206, 306 may execute first instructions 214 that cause the transformation processor 106, 206, 306 to perform the near-field to far-field transformation of the received wireless signals 102, 202, 302. The transformed signals 107, 307 may be provided as far-field antenna pattern 219 by the transformation processor 106, 206, 306. In addition or as alternative, the signal processor 108, 208, 308 may execute second instructions that cause the signal processor 108, 208, 308 to calculate the minimum far-field distance 109, 209, 309.

The signal processor 108, 208, 308 may identify in the far-field antenna pattern 219 the opening angle between the first nulls 432, 433 around the main lobe of the antenna pattern 429 and may calculate the minimum far-field distance 109, 209, 309 based on the determined opening angle. As an alternative, the signal processor 108, 208, 308 may identify in the far-field antenna pattern 219 the half power beam width 434 of the main beam of the antenna pattern 429 and may calculate the minimum far-field distance 109, 209, 309 based on the determined half power beam width 434.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

| List of reference signs | |
|---|---|
| 100, 200, 300 | test arrangement |
| 101, 201, 301 | test antenna |
| 102, 202, 302 | wireless signal |
| 103, 203, 303 | movable test antenna carrier |
| 104, 204, 304 | distance |
| 105, 205, 305 | received signal |
| 106, 206, 306 | transformation processor |
| 107, 307 | transformed signal |
| 108, 208, 308 | signal processor |
| 109, 209, 309 | minimum far-field distance |
| 213 | memory |
| 214 | first instructions |
| 215 | processor |
| 216 | memory |
| 217 | second instructions |
| 218 | processor |
| 219 | far-field antenna pattern |
| 220 | electric drive unit |
| 221 | power interface |
| 325 | anechoic chamber |
| 326 | absorbing element |
| 327 | door |
| 429 | antenna pattern |
| 430 | main lobe |
| 431 | opening angle |
| 432, 433 | first nulls |
| 434 | half power beam width |
| 150, 250, 350 | device under test |

The invention claimed is:

1. A test arrangement for wirelessly testing a device under test, the test arrangement comprising:

a test antenna for receiving wireless signals from the device under test and/or transmitting wireless signals to the device under test, a movable test antenna carrier that carries the test antenna and is movable to adjust the distance between the test antenna and the device under test, a transformation processor that is coupled to the test antenna and performs a near-field to far-field transformation based on the wireless signals received from the device under test and/or transmitted to the device under test and outputs respective transformed signals, and a signal processor that is coupled to the transformation processor and calculates a minimum far-field distance for the device under test based on the transformed signals, wherein the signal processor evaluates if the distance between the test antenna and the device under test is equal to or larger than the calculated minimum far-field distance, and wherein a measurement is evaluated as a valid measurement if the measurement has been performed in a far-field of the device under test based on the calculated minimum far-field distance for the device under test.

2. The test arrangement of claim 1, comprising an electric drive unit that drives the movable test antenna carrier into a position that sets the test antenna apart from the device under test by at least the calculated minimum far-field distance.

3. The test arrangement of claim 1, wherein the transformation processor comprises first instructions that cause the transformation processor to perform the near-field to far-field transformation of the received wireless signals.

4. The test arrangement of claim 1, wherein the signal processor comprises second instructions that cause the signal processor to calculate the minimum far-field distance.

5. The test arrangement of claim 1, wherein the transformed signals are provided as far-field antenna pattern by the transformation processor.

6. The test arrangement of claim 5, wherein the signal processor identifies in the far-field antenna pattern the opening angle between the first nulls around the main lobe of the antenna pattern and calculates the minimum far-field distance based on the determined opening angle.

7. The test arrangement of claim 5, wherein the signal processor identifies in the far-field antenna pattern the half power beam width of the main beam of the antenna pattern and calculates the minimum far-field distance based on the determined half power beam width.

8. The test arrangement of claim 1, comprising a measurement chamber that accommodates the test antenna and the device under test.

9. The test arrangement of claim 8, wherein the measurement chamber comprises an anechoic chamber.

10. A test method for wirelessly testing a device under test, the test method comprising:

receiving wireless signals from the device under test and/or transmitting wireless signals to the device under test with a test antenna, performing a near-field to far-field transformation based on the wireless signals received from the device under test and/or transmitted to the device under test and outputting respective transformed signals with a transformation processor that is coupled to the test antenna, calculating a minimum far-field distance for the device under test based on the transformed signals with a signal processor that is coupled to the transformation processor, and evaluating with the signal processor if the distance between the test antenna and the device under test is equal to or larger than the calculated minimum far-field distance, and wherein a measurement is evaluated as a valid measurement if the measurement has been performed in a far-field of the device under test based on the calculated minimum far-field distance for the device under test.

11. The test method of claim 10, comprising driving a movable test antenna carrier, which carries the test antenna and is movable to adjust the distance between the test antenna and the device under test, into a position that sets the test antenna apart from the device under test by at least the calculated minimum far-field distance.

12. The test method of claim 10, wherein the transformation processor executes first instructions that cause the transformation processor to perform the near-field to far-field transformation of the received wireless signals.

13. The test method of claim 10, wherein the signal processor executes second instructions that cause the signal processor to calculate the minimum far-field distance.

14. The test method of claim 10, wherein the transformed signals are provided as far-field antenna pattern by the transformation processor.

15. The test method of claim 14, wherein the signal processor identifies in the far-field antenna pattern the opening angle between the first nulls around the main lobe of the antenna pattern and calculates the minimum far-field distance based on the determined opening angle.

16. The test method of claim 14, wherein the signal processor identifies in the far-field antenna pattern the half power beam width of the main beam of the antenna pattern and calculates the minimum far-field distance based on the determined half power beam width.

17. The test method of claim 10, comprising accommodating the test antenna and the device under test in a measurement chamber.

18. The test method of claim 17, wherein the measurement chamber comprises an anechoic chamber.

* * * * *